(12) United States Patent
Garland et al.

(10) Patent No.: US 6,975,862 B1
(45) Date of Patent: Dec. 13, 2005

(54) WIRELESS TELEMETERING ACCESS

(75) Inventors: Stuart Mandel Garland, Morton Grove, IL (US); David B. Smith, Hinsdale, IL (US); Jane Ann Thompson, Batavia, IL (US); Robin Jeffrey Thompson, Batavia, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/520,861

(22) Filed: Mar. 7, 2000

(51) Int. Cl.[7] .............................................. H04Q 7/20
(52) U.S. Cl. ................... 455/433; 455/426; 455/67.11; 340/870.02; 370/338; 709/223
(58) Field of Search ............................... 455/426, 67.1, 455/433, 67.11, 67.7, 554.2; 340/870.02; 370/338

(56) References Cited

U.S. PATENT DOCUMENTS

| | | | |
|---|---|---|---|
| 5,699,407 A * | 12/1997 | Nguyen | 455/462 |
| 5,719,564 A * | 2/1998 | Sears | 340/870.02 |
| 6,069,571 A * | 5/2000 | Tell | 340/870.02 |
| 6,125,275 A * | 9/2000 | Comer et al. | 455/426 |
| 6,393,275 B1 * | 5/2002 | Alfred | 455/422.1 |
| 6,501,946 B1 * | 12/2002 | Farah et al. | 455/414.1 |
| 6,684,245 B1 * | 1/2004 | Shuey et al. | 709/223 |

* cited by examiner

Primary Examiner—Nick Corsaro
Assistant Examiner—Alan T. Gantt

(57) ABSTRACT

Apparatus and a method for providing, to a service provider, telemetry access to customer equipment. The telemetry access is provided using wireless access means to avoid having to provide special residential wiring to connect to meters and control devices at customer premises. Each customer device is provided with a cellular station having its own mobile identity, either an international mobile switching identifier (IMSI) or a mobile identity number (MIN). Each IMSI or MIN need not be associated with a different telephone number. For example, a single telephone number can be assigned to a service provider to access all devices telemetered by that service provided. Advantageously, this arrangement provides for an inexpensive method and apparatus for accessing customer devices.

20 Claims, 2 Drawing Sheets

WIRELESS TELEMETERING ACCESS

TECHNICAL FIELD

Figure 1:
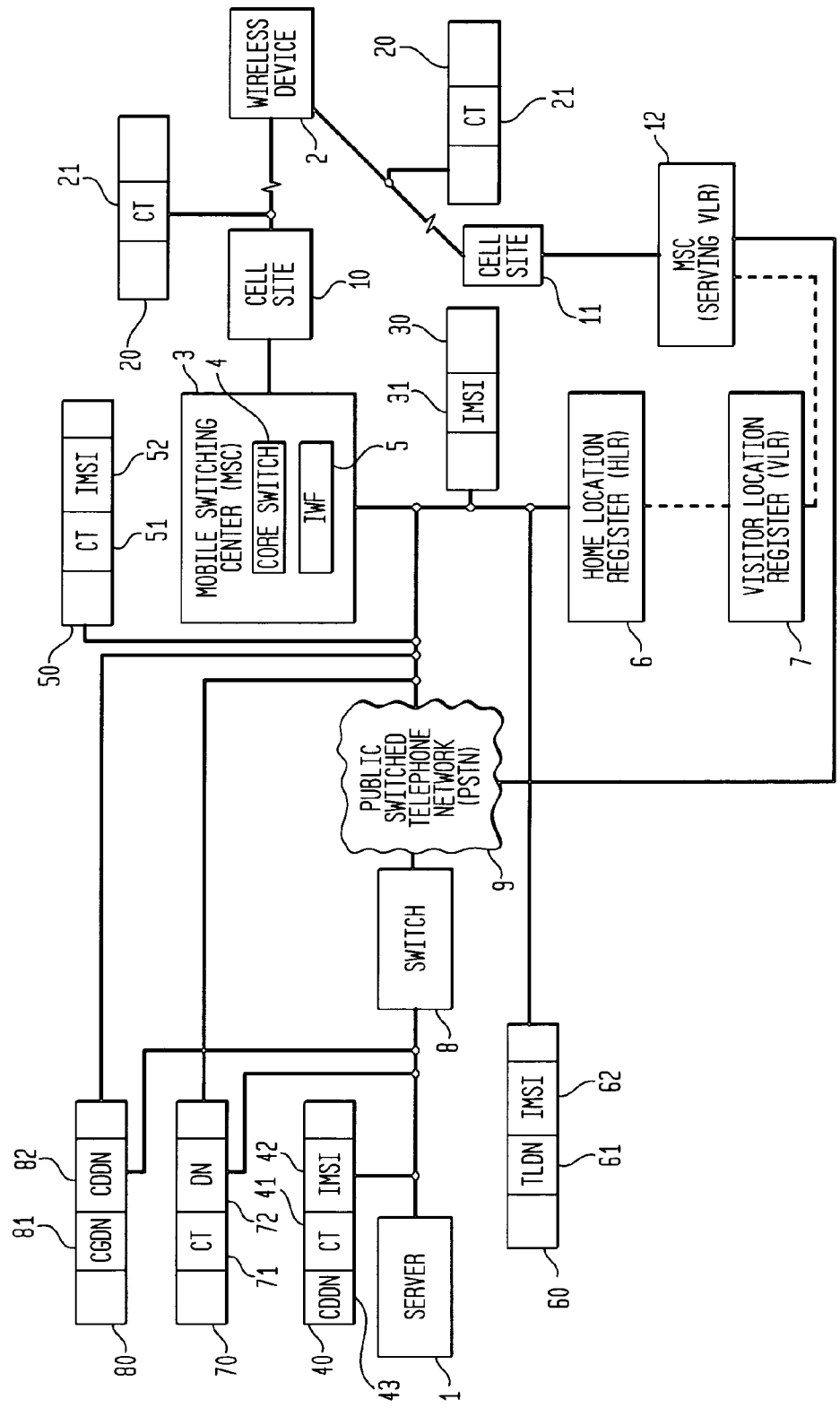

This invention relates to a method and apparatus for establishing communications between service providers and customer equipment.

PROBLEM

A common example of a need for a service provider to access customer equipment is for the purpose of reading electrical meters. Such meters may be read manually or through telemetering arrangements. In the past, some telemetering arrangements have used the power line as the communication access for the service provider. More recently, arrangements such as those described in S. M. Garland: U.S. Pat. No. 5,189,694, issued Feb. 23, 1993, have been used to access telemetering equipment over a telephone line to the customer premises equipment. A problem with all of these arrangements is that the cost of connection to specific customer premises equipment devices continues to remain high.

SOLUTION

Applicants have analyzed the factors that determine the cost of telemetering access, and have found that a major factor is the labor required to install the necessary wiring in customer premises to allow a telephone line and associated telemetering equipment to have access to a unit such as an electric meter, water meter, a gas meter, residential devices including such devices as a smart thermostat, smart refrigerator, smart air conditioner, or commercial devices such as vending machines and copiers.

The above problem is solved according to Applicants' invention by the use of a wireless connection between the customer equipment and a switch connectable to a data collection service provider; in order to permit the service provider to access a customer device, the customer device is provided with a cellular station having its own IMSI (International Mobile Switching Identifier) or equivalent Mobile Identity Number (MIN). The telephone number associated with the IMSI or MIN, may be that of the home owner or that of the service provider. Advantageously, the device need not be wired to a telephone loop.

In accordance with this invention, the telephone number is used for routing the accessing call through the Public Switched Telephone Network (PSTN), and the IMSI is used once the call has been routed to a MSC to obtain information about the location of the device to be accessed. The IMSI is used to page the device. The telephone number associated with the device to be accessed need not be a telephone number of a customer. Advantageously, one telephone number can serve a small or large number of devices, and each individual device is identified by a unique IMSI; in fact, one telephone number can be used to access all devices served by a wireless service provider.

In an alternate embodiment, individual telephone numbers are assigned to each device, and the telephone numbers are recognized as being numbers of wireless stations. In that case, the translation of the telephone number to an IMSI provides the key to the IMSI database which contains information about the characteristics of the device being accessed.

Reverse access is also possible, for example, from a unit within an automobile that transmits information to a service provider about pending or real problems in the automobile. For the case of an automobile, a single directory number can be used to access multiple IMSI devices. The IMSI of the calling device then identifies information for accessing the service provider. Advantageously, mobile devices can be served.

Access may either be polled; i.e., periodic connections from a service provider to a device, for example, for checking inventory; or can be initiated from the device, for example, for requesting re-supply when inventory is low.

The IMSI is obtained either directly from a set-up message (incoming call to a device), or origination request (outgoing call from a device), or can be found from a translation of an individual directory number (incoming call to a device). The IMSI identifies the Home Location Register (HLR) entity, that contains information about that IMSI. For incoming calls to the device, the HLR will then provide the identity of a VLR (Visitor Location Register), for supplying up-to-date information associated with the device's present location if the device is located, for example, in an automobile. Advantageously, this type of arrangement takes advantage of the existing cellular infrastructure.

In one preferred embodiment of Applicants' invention, an Integrated Services Digital Network (ISDN) connection, is used between the service provider and a switch of the Public Switched Telephone Network (PSTN). In one preferred embodiment, this ISDN connection uses a Primary Rate Interface (PRI), to provide 23 or more communication channels (B-Channels), and 1 control channel (D-Channel), for serving 23 or more simultaneous connections. In another embodiment, a Basic Rate Interface (BRI), can be used to provide 1 or 2 communication channels between the service provider and the PSTN switch.

In one embodiment of this invention, new optional fields of the standard ISUP protocol and/or ISDN protocol can be used to convey the IMSI to the MSC serving the device.

In one embodiment, the MSC and HLR support a location request message in which the IMSI, not the called directory number, is the location access key. The serving MSC then allocates a temporary routing number, when necessary, with the IMSI.

In alternate embodiment, calls to a single directory number can be directed to a selected device based on the call type, (e.g., telemetry, circuit mode data, voice) of the call.

In one embodiment, the calling party category can be used to indicate a telemetry call for billing purposes.

In one embodiment, the calling and called numbers together can be used to determine an IMSI and its associated telemetry device. In this case, the IMSI is not transmitted across the network. For a particular called directory number, the calling directory number of a service provider provides the IMSI for the destination telemetry device. For example, the electric company may access one IMSI, the gas company, another. The service provider is identified by the calling directory number.

In alternate embodiments, the telemetry calls may be given a low priority and be torn down if the number of available radio channels goes below some threshold.

In accordance with one embodiment of the invention, an Intelligent Pathway (Suppressed ringing) connection is used to access the device. Advantageously, such an arrangement allows the network to avoid interference between devices having a common directory number, and permits several of the devices sharing a directory number to be active, (off-hook) simultaneously, and to avoid forwarding a call to a busy device to a forwarding number of the directory number.

The use of an Intelligent Pathway connection allows the full cost of the call to be billed to the server, in contrast to other types of cellular calls.

BRIEF DESCRIPTION OF THE DRAWING(S)

Figure 2:
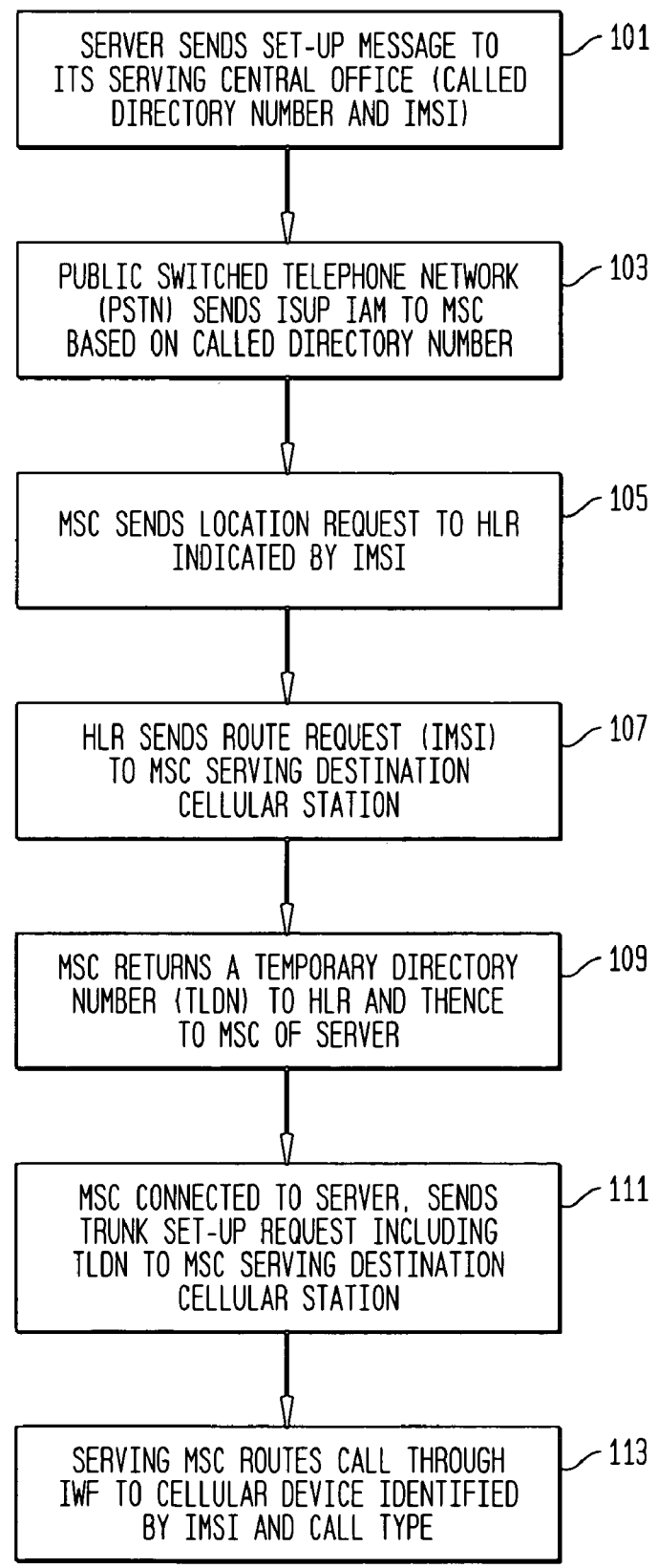

FIG. 1 is a block diagram, illustrating the architecture of Applicants' invention; and FIG. 2 is a flow diagram, illustrating the method of Applicants' invention.

DETAILED DESCRIPTION

FIG. 1 is a block diagram illustrating the architecture of Applicants' invention. To illustrate the most general case, in this example, the server 1 is connected to a switch 8, other than a mobile switching center, and accesses a mobile switching center through the Public Switched Telephone Network, (PSTN) 9. The facility between the server and switch 8 can be an Integrated Services Digital Network (ISDN) facility using a Basic Rate Interface (BRI) or Primary Rate Interface (PRI); advantageously, the control channel of the ISDN interface can be used to transmit digital control messages. The mobile switching center 3, then accesses a Home Location Register 6, a Visitor Location register 7, and a cell site 10. The cell site 10 is for communicating with a customer's wireless device 2.

The mobile switching center (MSC) includes a core switch 4, and an interworking function (IWF) Block 5. The purpose of the interworking function of the MSC serving the wireless device 2 is to interface with a Public Switched Telephone Network (PSTN) signal on one side, and a wireless data signal on the other side. The wireless data signal is converted at the cell site into a digital code division multiple access (CDMA) signal, or a digital time division multiple access (TDMA) signal, sent by radio to the wireless device. The server 1, switch 8, PSTN 9, MSC 3, cell site 10, HLR 6, VLR 7, and IWF 5 are all well known in the prior art. The device is similar to devices used with respect to suppressed ringing telemetry except that they do not need functions for cutting off transmission in response to an off-hook by the customer (since they can transmit and receive while the customer is using a voice telephone), but need the circuits required to make outgoing and/or receive incoming wireless communications. A wireless device can also be used as a gateway to access other devices identified by a sub-address in messages to and from the server. For a call from a server to a wireless device, the server sends a set-up request message 40 over an ISDN connection or analog data connection to its serving switch 8. The message has been enhanced to include a call type 41, and an IMSI 42 (if available), of the wireless device 2. These parameters are passed on transparently by the switch 8 which serves the server. The called directory number 43, which is part of every set-up request message 40, is used by the switch to route the call over PSTN 9 to MSC 3. The PSTN passes message 50 to MSC 3. Message 50 contains a call type 51 and the IMSI 52, which is a trigger to the MSC to indicate that this is a call to a particular device rather than a conventional wireless station. MSC 3 examines the parameters it has received, and it recognizes that one of the parameters is an IMSI. Thus, a single called directory number can be used to route multiple calls to multiple end points in the wireless network. The end points are differentiated via the unique IMSI identifiers.

MSC 3 uses the IMSI to access information about wireless device 2 via Home Location Register (HLR) 6; it does so by sending a request message 30, which includes the IMSI 31. The HLR which has tables for translating between an IMSI and data associated with that IMSI, returns its information to MSC 3. (The HLR is required to have such translation tables in order to handle registration events originated by a wireless station; such events do not supply a mobile device directory number, but only supply a mobile device IMSI). HLR 6 then accesses a VLR 7 to receive additional information about, for example, the location and status of the wireless device. MSC 3, (or if necessary, another MSC such as MSC 12, connected to MSC 3 via the PSTN, in case the wireless device 2 is not in its home location), then pages wireless device 2, and controls establishment of a radio connection between cell site 10, (or cell site 11 if MSC 12 controls call), and wireless device 2. The wireless device receives a message 20 containing a call type 21 and the IMSI for the accessed device. The call type can indicate to the device that, for example, the call is a no-ring telemetry data call, which indication can trigger a predefined sequences of actions, (e.g., supply telemetering data). The call type also indicates to the MSC that this is a no-ring call, that certain features, (such as call waiting, call blocking), are to be by-passed, that a different type of alerting, i.e., to activate a device, is to be used, and that special billing procedures may be applied.

If the wireless device is a mobile one, and has moved outside its home area, then in conformance with wireless standards, that device has been provided with a Temporary Local Directory Number (TLDN), associated with the IMSI of the device, by the serving VLR/MSC. In accessing the HLR 6, message 60 is used to provide the HLR with the TLDN 61, as well as the IMSI 62. The TLDN is sent through the HLR to the MSC 3 to route calls destined for the mobile device to the serving MSC.

In alternate implementations, wherein the server is not provided with the IMSI of the called wireless device, the server sends a message 70 that includes a call type 71, and a directory number 72 for that device. The HLR is then accessed using the call type and directory number which it uses to identify the destination IMSI. The calling directory number can be used for billing the call, or the number to be billed can be obtained by a table look-up based on the call type and IMSI.

In another alternate embodiment, the server simply provides, as it does for all calls, a message 80 including a calling directory number 81, and a called directory number 82. The HLR 6 is queried using both calling and called directory number, and uses the combination of these two parameters to identify the IMSI of the called wireless device. This embodiment allows for multiple devices, (gas, water, etc.), at a single location, to be accessed via one directory number without requiring the server to know or the network (PSTN), to transport the IMSI of its device.

Note that, in all of these cases, in contrast to the processing of normal voice calls, the final translation information required for establishing the call is provided by the HLR on the basis of the IMSI of the called wireless device.

FIG. 2 is a flow diagram, illustrating the process of setting up a call in accordance with the principles of this invention. The application server sends a set-up message which includes both a directory number and a mobile identifier such as an IMSI, to a central office, (Action Block 101). This message would be sent over an ISDN facility, such as a primary rate interface (PRI), or a basic rate interface (BRI), over the control channel, or the message could be directly sent as an ISUP message if there is an ISUP trunk between the server and the central office. The message is received in the central office, and forwarded as an ISUP initial address message (LAM) 3, to a mobile switching center, (Action Block 103). The MSC sends a location request message to the HLR, (Action Block 105). This HLR is associated with the device identified by the IMSI. The HLR contains data for the device identified by the IMSI, which identifies the MSC currently serving the destination cellular station. The HLR can also specify a call type associated with that IMSI if the call type is not provided in the call set-up messages. The HLR then sends a route request to the identified MSC serving the cellular destination, which routing request includes the IMSI and a call type, (Action Block 107). The serving MSC provides a temporary local directory number (TLDN), to the MSC serving the server, (Action Block 109). The TLDN is allocated only during the call set-up and then de-allocated. The TLDN is transmitted from the serving MSC/VLR through the HLR to the requesting MSC. The two MSCs do not communicate directly for ANSI-41 signaling. The HLR does not record the TLDN because this number only exists during the call set-up. The MSC does store the call type.

The MSC then sends a trunk set-up request message to the MSC serving the cellular destination using the TLDN to identify the destination, (Action Block 111). The serving MSC routes the call through its IWF to the wireless device identified by the IMSI and the call type, (Action Block 113).

The above description is of one preferred embodiment of Applicants' invention, plus several specific alternatives. Many other alternative embodiments will be apparent to those of ordinary skill in the art, without departing from the scope of the invention. The invention is only limited by the attached claims.

What is claimed is:

1. Apparatus for establishing a connection between a server system and a selected cellular device, comprising:
    infrastructure of a Public Switched Telephone Network (PSTN), and a cellular wireless communication network;
    means for connecting a server system to said infrastructure;
    wherein a plurality of wireless cellular devices are associated with a single directory number;
    wherein, on a call originated by said server system, said server system provides information for identifying a mobile identification number of said selected cellular device;
    said infrastructure comprising Home Location Register means for storing tabular data for deriving a mobile identification number from said information received from said server system;
    wherein on a call originated by said server system, only the selected cellular device having said mobile identification number is alerted and connected/to said server system.

2. The apparatus of claim 1, wherein said single directory number is a directory number of said server system.

3. The apparatus of claim 1, wherein all wireless cellular devices served by a server system are associated with a common directory number.

4. The apparatus of claim 1, wherein said mobile identification number is an international mobile switching identifier (IMSI).

5. The apparatus of claim 1, wherein the information provided by said server system comprises an international mobile switching identifier (IMSI).

6. The apparatus of claim 1, wherein said home location register (HLR) means is adapted to be responsive to a location request message comprising a mobile identification number as a search parameter.

7. The apparatus of claim 1, wherein an integrated services digital network (ISDN) facility connects said server system to said infrastructure in order to facilitate transmission of said information for identifying said mobile identification number.

8. Apparatus for establishing a connection between a server system and a selected cellular device, comprising:
    infrastructure of a Public Switched Telephone Network (PSTN), and a cellular wireless communication network;
    means for connecting a server system to said infrastructure;
    wherein a plurality of wireless cellular devices are associated with a single directory number;
    wherein, on a call originated by said server system, said server system provides information for identifying a mobile identification number of said selected cellular device;
    said infrastructure comprising Home Location Register means for storing tabular data for deriving a mobile identification number from said information received from said server system;
    wherein on a call originated by said server system, only the selected cellular device having said mobile identification number is alerted and connected to said server system;
    wherein the information provided by said server system comprises a terminating directory number plus an originating directory number.

9. The apparatus of claim 8, wherein said terminating directory number is a directory number for a plurality of wireless devices in a single household.

10. Apparatus for establishing a connection between a server system and a selected cellular device, comprising:
    infrastructure of a Public Switched Telephone Network (PSTN), and a cellular wireless communication network;
    means for connecting a server system to said infrastructure;
    wherein a plurality of wireless cellular devices are associated with a single directory number;
    wherein on a call originated by said server system said server system provides information for identifying a mobile identification number of said selected cellular device;
    said infrastructure comprising Home Location Register means for storing tabular data for deriving a mobile identification number from said information received from said server system;
    wherein on a call originated by said server system, only the selected cellular device having said mobile identification number is alerted and connected to said server system;
    wherein the information provided by said server system comprises a terminating directory number and a call type.

11. A method of establishing a connection between a server system and a selected cellular device comprising the steps of:
    connecting said server system to a Public Switched Telephone Network (PSTN) and a cellular wireless communication network;
    associating a plurality of wireless cellular devices with a single directory number;

said server system providing information for deriving a mobile identification number;

storing tabular data describing characteristics of said wireless cellular device in home location register means of said cellular wireless communication network;

accessing said tabular data via a mobile identification number, derived from said information of said selected wireless device;

wherein on a call originated by said server system only the selected cellular device having said mobile identification number is alerted and connected to said server system.

12. The method of claim 11 wherein said single directory number is a directory number of said server system.

13. The method of claim 11 wherein all wireless cellular devices served by said server system are associated with a common directory number.

14. The method of claim 11, wherein said mobile identification number is an international mobile switching identifier (IMSI).

15. The method of claim 11, wherein the information provided by said server system comprises an international mobile switching identifier (IMSI).

16. The method of claim 11, wherein said home location register means is adapted to be responsive to a location request message comprising a mobile identification number as a search parameter.

17. The method of claim 11, wherein an integrated services digital network (ISDN) facility connects said server system to said infrastructure, in order to facilitate transmission of said information for identifying said mobile identification number.

18. A method of establishing a connection between a server system and a selected cellular device comprising the steps of:

connecting said server system to a Public Switched Telephone Network (PSTN) and a cellular wireless communication network;

associating a plurality of wireless cellular devices with a single directory number;

said server system providing information for deriving a mobile identification number;

storing tabular data describing characteristics of said wireless cellular device in home location register means of said cellular wireless communication network;

accessing said tabular data via a mobile identification number derived from said information of said selected wireless device;

wherein on a call originated by said server system, only the selected cellular device having said mobile identification number is alerted and connected to said server system;

wherein the information provided by said server system comprises a terminating directory number plus an originating directory number.

19. The method of claim 18, wherein said terminating directory number is a directory number for a plurality of wireless devices in a single household.

20. A method of establishing a connection between a server system and a selected cellular device comprising the steps of:

connecting said server system to a Public Switched Telephone Network (PSTN) and a cellular wireless communication network;

associating a plurality of wireless cellular devices with a single directory number;

said server system providing information for deriving a mobile identification number;

storing tabular data describing characteristics of said wireless cellular device in home location register means of said cellular wireless communication network;

accessing said tabular data via a mobile identification number, derived from said information of said selected wireless device;

wherein on a call originated by said server system, only the selected cellular device having said mobile identification number is alerted and connected to said server system;

wherein the information provided by said server system comprises a terminating directory number and a call type.

* * * * *